US006928116B2

(12) United States Patent
Weon (10) Patent No.: US 6,928,116 B2
(45) Date of Patent: Aug. 9, 2005

(54) MOTION ESTIMATION METHOD USING MULTILEVEL SUCCESSIVE ELIMINATION ALGORITHM

(75) Inventor: Do-Yeon Weon, Seoul (KR)

(73) Assignee: Pantech Co., Ltd., Seoul (KR)

( * ) Notice: Subject to any disclaimer, the term of this patent is extended or adjusted under 35 U.S.C. 154(b) by 26 days.

(21) Appl. No.: 10/735,066

(22) Filed: Dec. 11, 2003

(65) Prior Publication Data

US 2004/0233985 A1 Nov. 25, 2004

(30) Foreign Application Priority Data

May 20, 2003 (KR) .................................. 10-2003-0031853

(51) Int. Cl.⁷ .................................................. H04N 7/12
(52) U.S. Cl. .................................. 375/240.16; 348/699
(58) Field of Search .................. 375/240.12–240.17; 348/699–700; 382/236, 238; 386/109, 111

(56) References Cited

U.S. PATENT DOCUMENTS

| 5,896,466 A | * | 4/1999 | Kim .......................... 382/242 |
| 2003/0012282 A1 | | 1/2003 | Chelladurai et al. |
| 2003/0123550 A1 | | 7/2003 | Wang et al. |
| 2003/0198295 A1 | * | 10/2003 | Chen et al. ............ 375/240.16 |

FOREIGN PATENT DOCUMENTS

| JP | 2001-245297 | 9/2001 |
| KR | 2000-32857 | 6/2000 |
| KR | 2001-76707 | 8/2001 |

OTHER PUBLICATIONS

Lee et al, "A Fast Hierarchical Motion–Compensation Scheme for Video Coding Using Block Feature Matching", IEEE Trans. on Circuits and Systems for Video Technology, vol. 6, No. 6, pp. 627–635, Dec. 1996.*
Do–Yeon Weon, "An efficient MSEA in the motion estimation", Dec. 13, 2002, Image & Communication Lab. In Pusan National University.

* cited by examiner

*Primary Examiner*—Vu Le (57) ABSTRACT

The present invention provides a motion estimation method using a multilevel successive elimination algorithm. The present invention includes the steps of: a) selecting an initial candidate block among a plurality of candidate blocks in an image frame for computing an initial SAD; b) selecting four vertex candidate blocks placed at vertexes of a imaginary perfect square based on the initial candidate block as the center of the imaginary perfect square; c) extracting elimination levels of the four vertex candidate blocks by performing the MSEA; d) predicting elimination levels for side candidate blocks which are located at sides of the perfect square based on a spatial correlation between elimination levels of candidate blocks and the extracted elimination levels of the four vertex candidate blocks; and e) extracting elimination levels of the side candidate blocks by performing the MSEA based on the predicted elimination level.

7 Claims, 8 Drawing Sheets

A) MSEA ALGORITHM

···· CANDIDATE BLOCKS IN FIRST STEP PROCESS

FIG. 7

MOTION ESTIMATION METHOD USING MULTILEVEL SUCCESSIVE ELIMINATION ALGORITHM

BACKGROUND OF THE INVENTION

1. Field of the Invention

The present invention relates to a motion estimation method using a multilevel successive elimination algorithm and a computer readable recording medium for executing the same method.

2. Description of Related Art

Recently, interests and needs for multimedia data communications field have been increased as image conference system, IMT-2000 terminal, etc. are researched and developed due to rapid progress of information communications technology. Among these multimedia data communications, technical field which has currently get most much interests is just transmitting and receiving of various information via wireless network; and it becomes possible to transmit and receive even a large amount of data as the transmitting and receiving velocity of wireless data is improved.

However, the transfer capability of moving image data is excellent, whereas it is difficult to store, transmit and receive the moving image data as amount of data itself is enormous. Further, since the enormous moving image data is properly processed on the basis of requirements of applications, a higher specification of system for processing the moving image is required.

For overcoming these problems, there has been actively studied a moving image compression algorithm that is a scheme for transforming the enormous moving image data into smaller amount of data. As one example, moving image compression standard proposals that have been studied up to now are MPEG of ISO/IEC and H.26x of ITU-T.

For reference, compression method may be largely classified by lossless compression and loss compression. The lossless compression is a method that is capable of fully reconstructing original signal without incurring any loss at decoder, wherein the reconstructed data is fully identical to the original signal. In contrast, the loss compression is that the reconstructed data is not completely identical to the original data and its compression rate is higher than that of the lossless compression; and therefore, it is generally used in processing image or moving image data.

The moving image data has the characteristics of three redundancies: temporal, spatial, and statistical redundancies.

First of all, the temporal redundancy means a redundancy that exists between continuous frames where luminance values of pixels that exist at the same positions of the continuous frames have statistically similar correlations. This is called "redundancy of interframe".

Meanwhile, the spatial redundancy is a redundancy that presents within one frame wherein luminance value of a pixel has similar correlation to that of its neighboring pixels. This is called "redundancy of intraframe".

On the other hand, the statistical redundancy stands for a redundancy between transform codes and is called a redundancy between pixels or redundancy in coding.

By eliminating these three redundancies, it is possible to compress the enormous amount of moving image data into smaller amount of data. That is, discrete cosine transformer (DCT) and quantizer are used to eliminate the spatial redundancies, entropying coding is applied to remove the statistical redundancies, and motion estimation and compensation is utilized to eliminate the temporal redundancies.

Among the compression processes mentioned above, the motion estimation and compensation method for removing the temporal redundancies is largely classified by pixel-based estimation method and block-based estimation method. In general, in case of compressing moving image, the block-based estimation method is widely used compared to the pixel-based estimation method because of various efficient merits in the motion estimation (prediction). This method is called block matching algorithm (BMA).

The BMA may be largely classified by two matching methods: a full search block matching and a fast search block matching.

First, the full search block matching estimation is a scheme that performs matching calculation for all candidate blocks within a preset search range and has an advantage that it can obtain optimized motion vector. However, since this estimation requires a large amount of calculation, it is generally employed in the compression and reconstruction for storage medium compared to real-time moving image compression and transmission.

In contrast, since the fast search block matching motion estimation performs searching process for only part of candidate blocks within a search range, it has a shortcoming that it falls into local minimum. This results in the lowering of image quality and increasing of bit stream. However, the calculation amount thereof is relatively small compared to the full search block matching estimation, thereby making real-time moving image compression and transmission possible. As this fast search block matching motion estimation, there exist 3-step search, hierarchical search, diamond search, etc.

Meanwhile, as more improved motion estimation method, there presents a fast full search block matching motion estimation algorithm which all meets the advantages of both the full searching and fast searching block matching motion estimations. This algorithm provides optimum solution by fully searching and has an advantage that its calculation amount is small compared to the full search block matching motion estimation by deciding as to whether sum of absolute difference (SAD) calculation is done for candidate blocks using sum of average which is smaller than the calculation amount of SAD before the SAD calculation. As this fast full searching motion estimation algorithm, there are successive elimination algorithm (SEA), multilevel SEA (MSEA), and extended SEA (ESEA), etc.

First, the SEA is an algorithm that is applied characteristic of mathematical inequality to scale of motion estimation matching. In other words, the SEA is an algorithm for determining whether or not it would calculate SAD using sum of averages of blocks.

At that time, the relationship of average sum and SAD used in such a calculation may be represented as:

$$|R-M(x,y)| \leq SAD(x^*, y^*) \quad \text{Eq.(1)}$$

R and M(x,y) in Eq.(1) represent average sums of current frame block and candidate blocks within a search range of a previous frame, respectively. And, SAD(x*,y*) is minimum SAD till a current time for a current block and a candidate block. If the relationship of the average sum and SAD do not meet Eq.(1), then the candidate block at position of (x,y) is eliminated; and a next candidate block is compared to the current block. Otherwise, if the relationship meets Eq.(1), SAD(x,y) between the two blocks is derived and then compared to SAD(x*,y*). As the comparison result, if SAD(x,y) between the two blocks is smaller than SAD(x*,y*), SAD(x*,y*) is updated with SAD(x,y). As such, the SEA algorithm has calculative merits for the motion estimation by determining in advance whether or not it would calculate SAD for candidate blocks.

In the meantime, the MSEA is a scheme that extends the SEA to multilevel. The SEA considers that it depends on the relationship of average sum of blocks and SAD, and then decides whether or not it would derive SAD that needs actually large amount of calculation through the comparison of average sum of small sub-blocks calculated in each level and minimum SAD. With this process, the MSEA is capable of decreasing the amount of calculation because it can eliminate most candidate blocks using the average sum of sub-blocks.

Figure 2A:
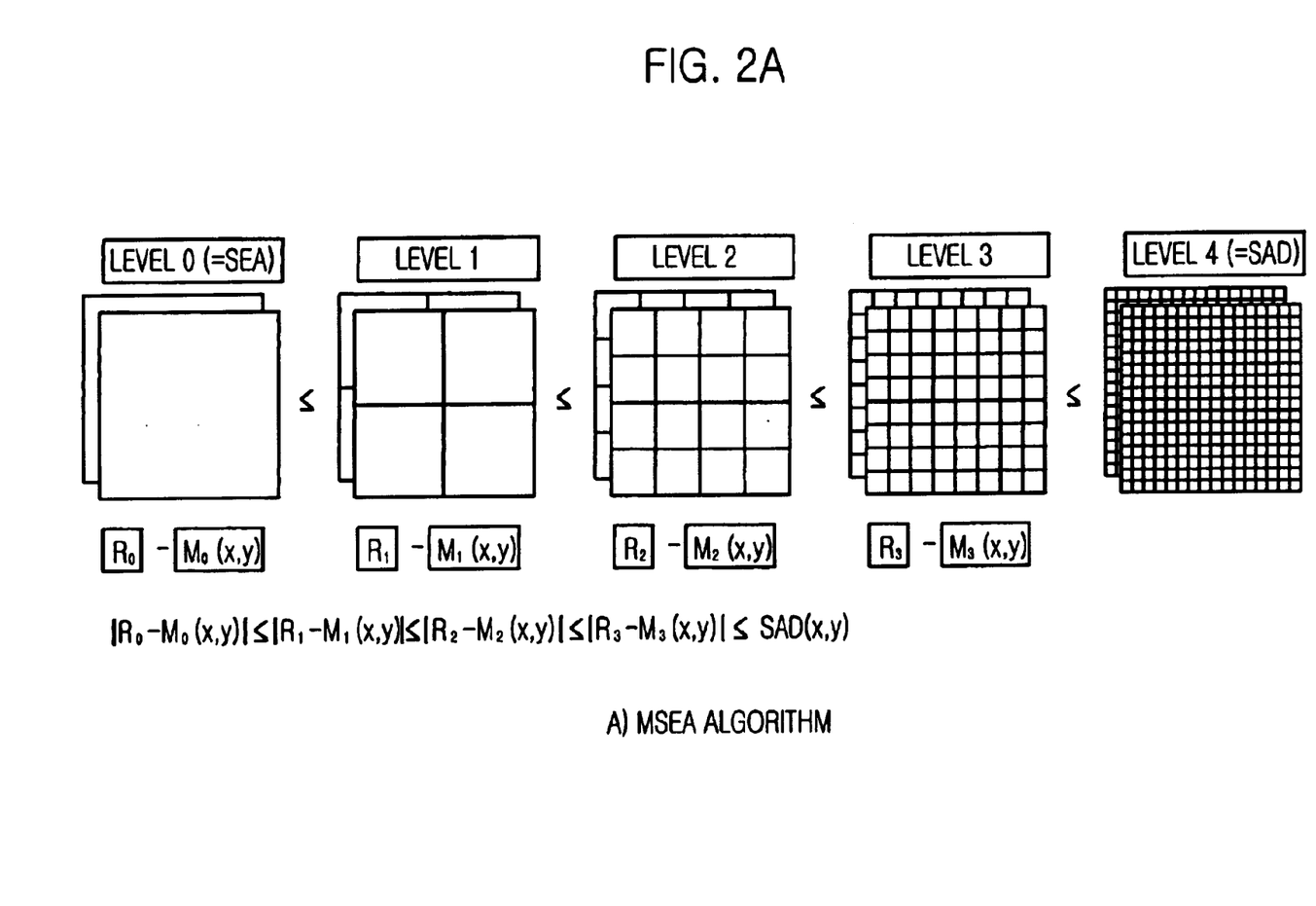
FIG. 2A is a view for explaining a fundamental scheme of MSEA.
Figure 2B:
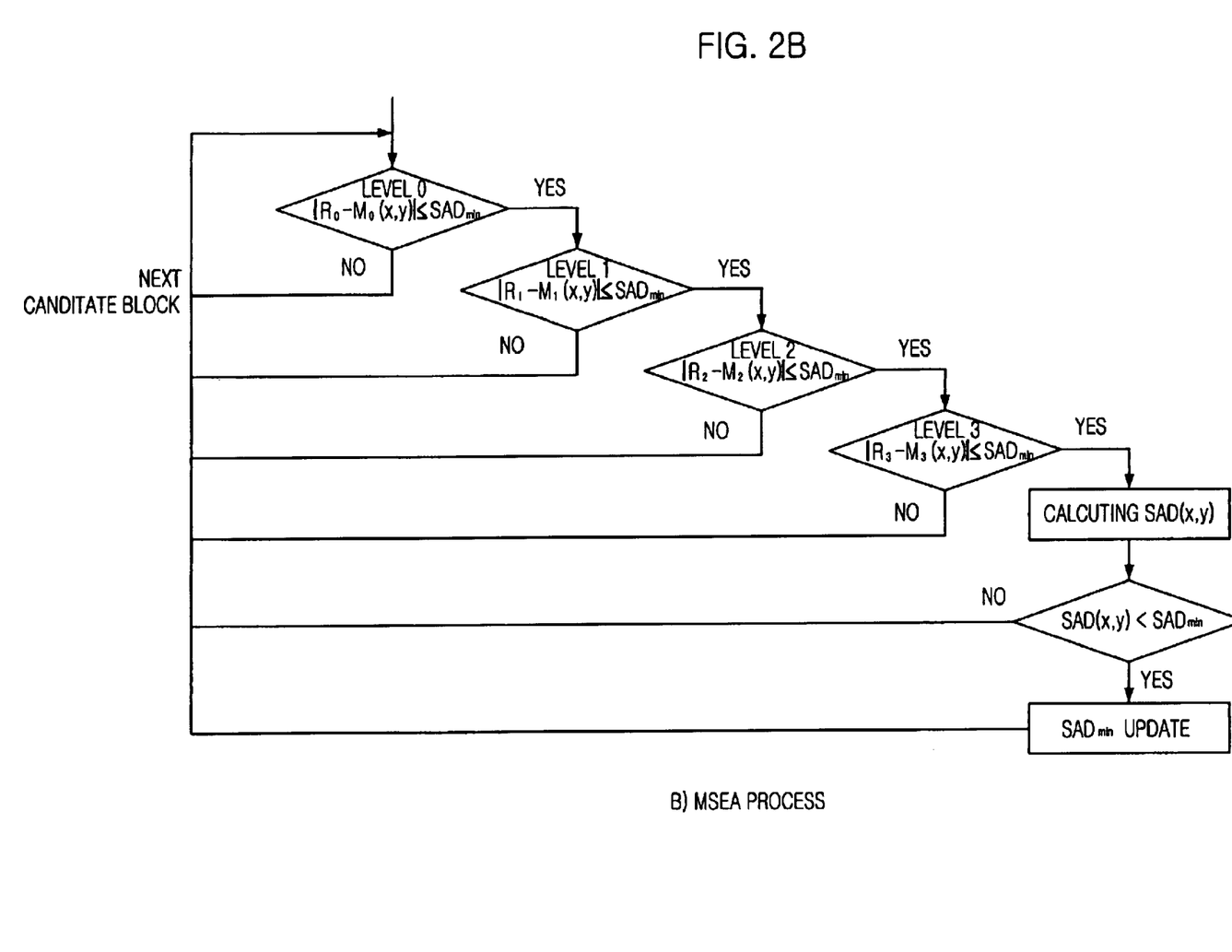
FIG. 2B is a flowchart for explaining process of MSEA.

FIGS. 2A and 2B are views showing a fundamental concept of MSEA. Referring to FIG. 2A, the SAD is computed at a level n when $|R_n-M_n(x, y)| \leq SAD(x, y)$, wherein the n is a number of level. That is, in the MSEA, an elimination level is computed by comparing average sum of small sub-blocks calculated in each level and minimum SAD based on following equation 2 and the SADs of the elimination levels is not computed. Therefore, large amount of computation SAD can be reduced.

$$|R_0-M_0(x, y)| \leq |R_1-M_1(x, y)| \leq |R_2-M_2(x, y)| \leq |R_3-M_3(x, y)| \leq SAD(x, y) \qquad \text{Eq. 2}$$

In Eq. 2, $R_n$ and $M_n(x,y)$ represent average sums of current frame block and candidate blocks at level n, respectively. And, SAD(x,y) is minimum SA'D.

FIG. 2B is a flowchart showing process of MSEA. Referring to FIG. 2B, in the MSEA, the SAD is only computed when $|R_n-M_n(x, y)| \leq SAD(x, y)$. Therefore, large amount of computation SAD for elimination levels is reduced in the MSEA.

On the other hand, ESEA is an algorithm that proposes a scheme that quickly calculates SAD of level 4 in the above-described MSEA.

In particular, in the MSEA having relatively high compression performance, it requires unnecessary calculation when calculating on a level-by-level basis. That is, since the decision whether or not it would calculate SAD of candidate blocks tends to start the algorithm from level 0 always among the multi-levels, there occurs load due to unnecessary calculation which causes by performing the algorithm from level 0 even around of initial SAD position having higher elimination level.

Thus, in the MSEA, there is required a scheme capable of eliminating unnecessary calculation when calculating on a level-by-level basis. The elimination levels exist with similar distribution in the center of the initial SAD position due to spatial correlations. Therefore, if it is possible to know elimination levels of several candidate blocks, elimination levels of remaining candidate blocks can be predicted on the basis of the spatial correlations. Using this characteristics, consequently, there has been required a method that is capable of improving the motion estimation method requiring the large amount of calculation more efficiently.

SUMMARY OF THE INVENTION

It is, therefore, an object of the present invention to provide a motion estimation method capable of improving operation efficiency for motion estimation by eliminating unnecessary calculations while obtaining optimized solution in a multilevel successive elimination algorithm and a computer readable recording medium storing a program for executing the same method.

To achieve the objects of the invention, in accordance with an aspect of the present invention, there is provided a moving image motion estimation method of moving image using a multilevel successive elimination algorithm (MSEA) including the steps of: a) selecting an initial candidate block among a plurality of candidate blocks in an image frame for computing an initial SAD; b) selecting four vertex candidate blocks placed at vertexes of a imaginary perfect square based on the initial candidate block as the center of the imaginary perfect square, wherein the imaginary perfect square is formed by using neighbor blocks adjacent from the initial candidate block; c) extracting elimination levels of the four vertex candidate blocks by performing the MSEA; d) predicting elimination levels for side candidate blocks which are located at sides of the perfect square based on a spatial correlation between elimination levels of candidate blocks and the extracted elimination levels of the four vertex candidate blocks; and e) extracting elimination levels of the side candidate blocks by performing the MSEA based on the predicted elimination level.

In accordance with another aspect of the present invention, there is provided a computer readable recording medium storing instructions for executing a moving image motion estimation method of moving image using a multilevel successive elimination algorithm (MSEA), the moving image motion estimation method including the steps of: a) selecting an initial candidate block among a plurality of candidate blocks in an image frame for computing an initial SAD; b) selecting four vertex candidate blocks placed at vertexes of a imaginary perfect square based on the initial candidate block as the center of the imaginary perfect square, wherein the imaginary perfect square is formed by using neighbor blocks adjacent from the initial candidate block; c) extracting elimination levels of the four vertex candidate blocks by performing the MSEA; d) predicting elimination levels for side candidate blocks which are located at sides of the perfect square by using the extracted elimination levels of the four vertex candidate blocks; and e) extracting elimination levels of the side candidate blocks by performing the MSEA based on the predicted elimination level.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

The above and other objects and features of the instant invention will become apparent from the following description of preferred embodiments taken in conjunction with the accompanying drawings.

Figure 1:
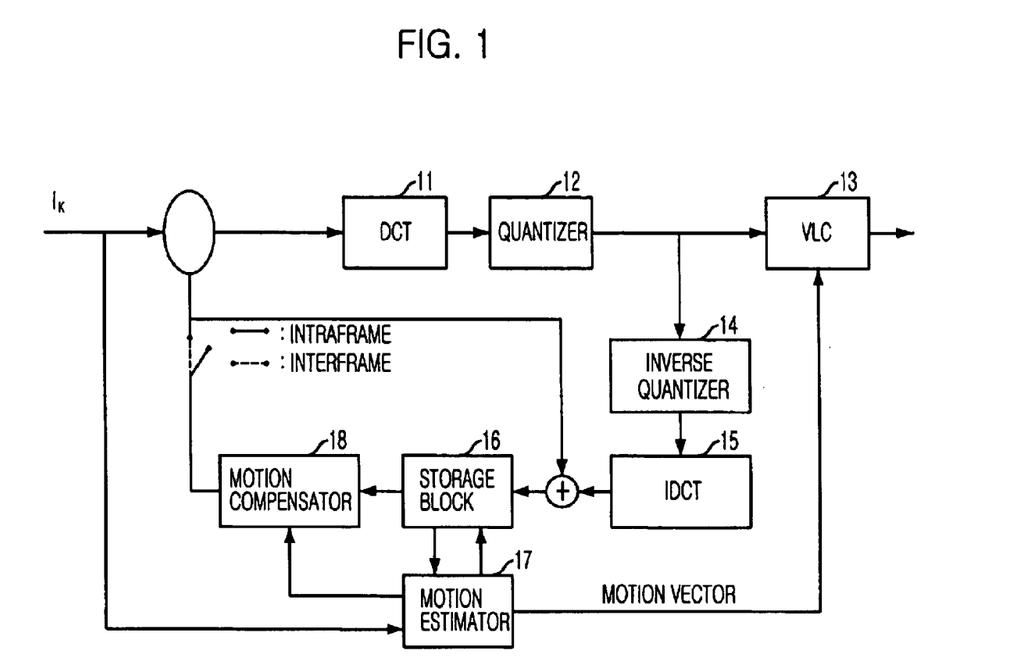
FIG. 1 is a block diagram illustrating a preferred embodiment of a moving image compression system employing the inventive method.

FIG. 1 is a block diagram for explaining a moving image compression system employing the inventive method in accordance with a preferred embodiment of the present invention.

As shown in FIG. 1, the moving image compression system employing the invention comprises a discrete cosine transformer (DCT) 11, a quantizer 12, a variable length coder (VLC) 13, an inverse quantizer 14, an inverse DCT (IDCT) 15, a storage block 16, a motion estimator 17, and a motion compensator 18.

The DCT 11 converts an image signal from a spatial domain to a frequency domain on a block-by-block basis of 8×8 pixels to provide a set of DCT transform coefficients, thereby eliminating spatial redundancies by using correlations in the image signal. Conventionally, since variance of the image data is relatively small, low frequency thereof, in particular, frequency component of 0(DC component) has a relatively large value whereas higher frequency component has a relatively small value; and therefore, most information is located in lower frequency and superior image quality can be obtained by way of quantization of the image data.

The quantizer 12 functions to decrease bit number of significant digit by dividing the DCT coefficients obtained at the DCT 11 by a certain constant. And, the quantizer 12 adjusts the magnitude of bit rate in accordance with a quantization value. At this time, if the quantization value is large, then image quality becomes deteriorative and the bit rate becomes small. In contrast, if the quantization value is small, then the image quality becomes better and the bit rate becomes large. This quantization may basically result in loss of data.

The VLC 13 functions to compress the 8×8 block data quantized by the quantizer 12 in accordance with the occurring probability. In the coefficients quantized at the quantizer 12 or motion vector information, there exists the phenomenon that its occurring probability is concentrated at any one portion. Thus, if a code of shorter length assigns to a value having high occurring probability and a code of longer length assigns to a value having low occurring probability, then there is an advantage in that average code length can be decreased. This coding is called Entropy Coding.

Now, moving image compression process in the moving image compression system will be simply explained to help with understanding below.

First, if a first frame is inputted, then its compressed data is outputted through the DCT 11, the quantizer 12 and the VLC 13. And, if a second frame is inputted, then the first frame quantized at the quantizer 12 is first reconstructed by way of the inverse quantizer 14 and the IDCT 15. Thereafter, difference data between the reconstructed image and the second frame is obtained at a subtracter and then processed through the DCT 11, the quantizer 12, and the VLC 13, thereby to output compressed date; and motion estimation is performed at the motion estimator 17 after adding the difference data to the reconstructed image at an adder.

As the most frequently used scheme for the motion estimation in the motion estimator 17, there is a motion vector prediction. This scheme is a technique that takes median value for each of horizontal and vertical directions using motion vector values of blocks that are located at left, upper, and right sides of a current block. In particular, it is known that the motion vector estimation scheme has the most superior performance as a technique using the spatial correlation that the current block will have similar characteristics to its neighboring blocks.

As mentioned above, the motion compensation is carried out at the motion compensator 18, in accordance with the motion vector obtained by the motion estimator 17.

Figure 3:
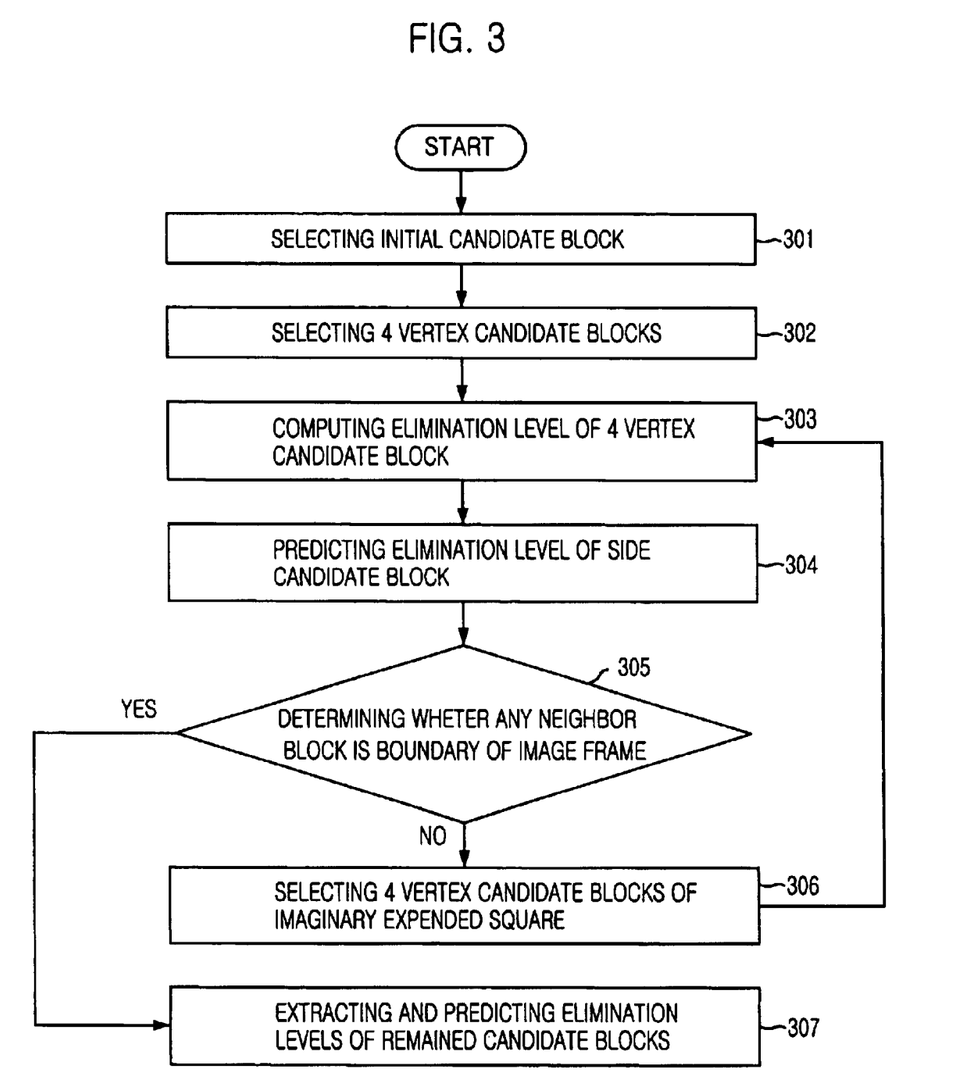
FIG. 3 shows a flowchart illustrating one embodiment of a moving image motion estimation method using a multilevel successive elimination algorithm in accordance with the present invention.

FIG. 3 is a flowchart for explaining a motion estimation method of the moving image using the MSEA in accordance with the present invention.

For understanding the motion estimation method of the moving image using the MSEA of the present invention, a conceptual background of the present invention is explained at first.

In the multilevel successive elimination algorithm MSEA, a level of candidate block for computing a sum of absolute difference SAD is determined at first and the SAD of the candidate block is computed without computing SAD value for elimination levels. By determined the level for computing SAD in advance, computation amount of SAD for elimination levels is decreased. For computing SAD for an image frame, the image frame is divided into a predetermined number of blocks and the SAD of each block is computed by using the MSEA. For computing SAD of each block, the elimination levels of the each block are computed at first for eliminating unnecessary calculation steps.

Figure 4:
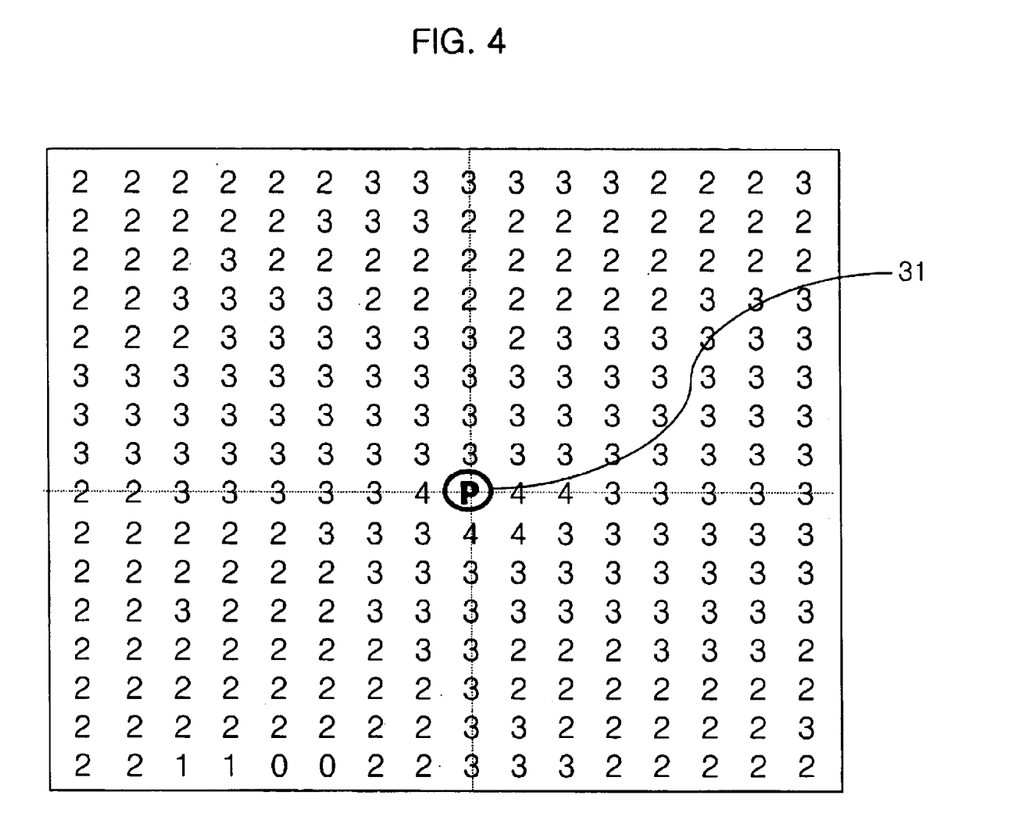
FIG. 4 presents a diagram for explaining one embodiment representing explaining elimination levels depending on plane distribution of sum of absolute difference (SAD) in the multilevel successive elimination algorithm used in the present invention.

FIG. 4 is a view showing an image frame divided blocks with elimination levels. Numbers on the image frame represents the elimination level of each block. In distribution of elimination level of each block in the image frame, there is spatial correlation between the elimination levels of blocks. Therefore, based on the spatial correlation between the elimination levels of blocks, elimination levels of blocks neighbored from a block in which an elimination level already computed can be predicted without complicated calculation steps. In the present invention, the elimination levels of blocks is predicted by using simple prediction steps, the computation amount of the conventional MSEA method is decreased.

Referring to FIG. 3, operations of a motion estimation method of the moving image using the MSEA in accordance with the present invention are explained hereinafter.

At first, an image frame is divided into a plurality of image blocks. An initial candidate block is randomly selected among the candidate blocks in the image frame and an initial SAD of the initial image block is computed at the step 301.

For selecting the initial block P, a motion vector prediction is used. The motion vector prediction is well-known prediction method and it is a disclosed at ISO/IEC JTC1 CD11172, "Information Technology-coding of Moving Pictures and Associated Audio for Digital Storage Media up to about 1.5 Mbit/s-part 2: Coding of Moving Picture Information", ISO, 1991. The motion vector prediction is a method for obtaining a median value of blocks adjacent to vertical direction or horizontal direction based on moving vector values of blocks neighbored to left, right, up and below in a center of a current block.

Figure 5:
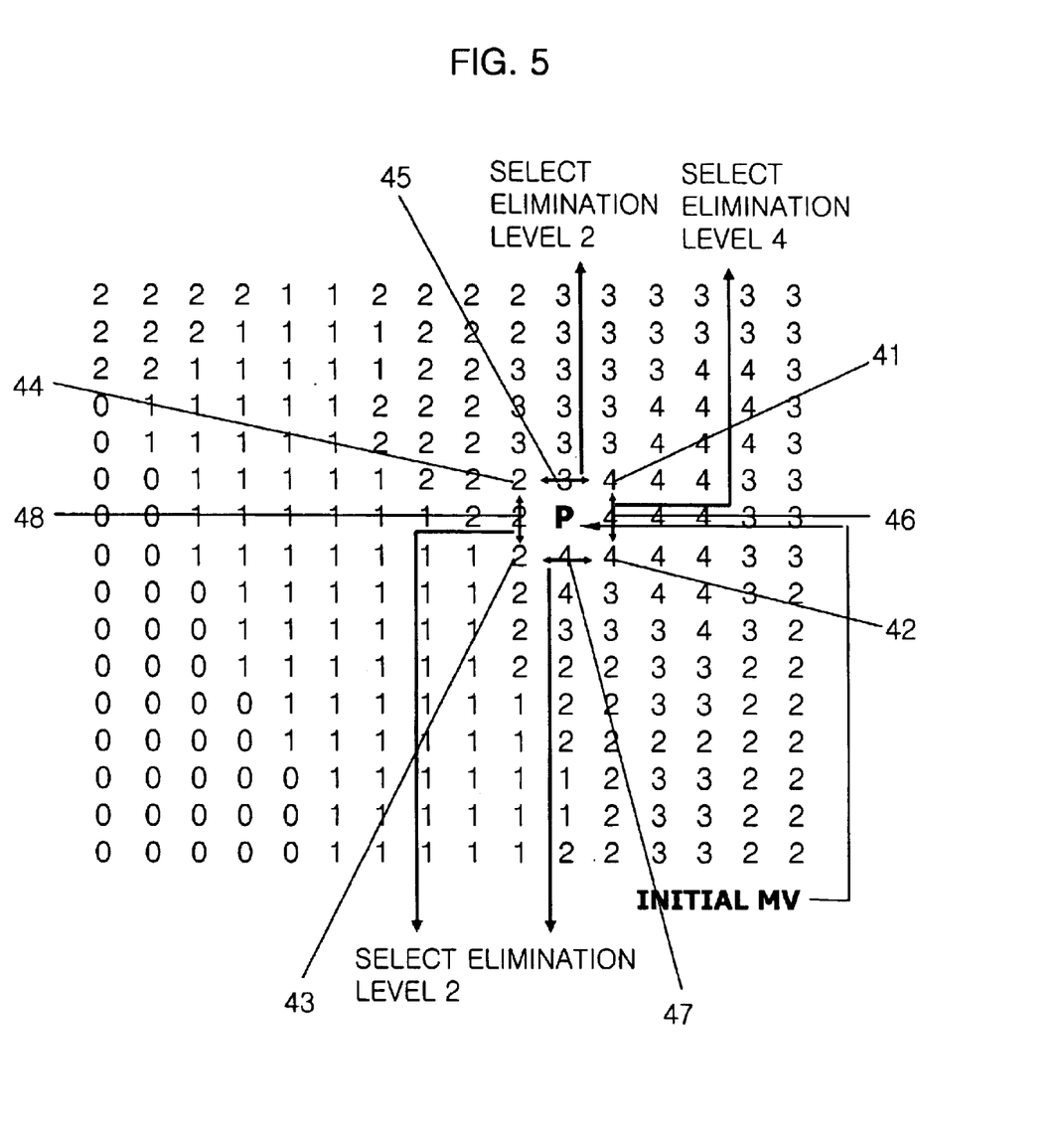
FIG. 5 is a diagram for illustratively explaining a process of predicting position of initial SAD in the moving image motion estimation method employing the multilevel successive elimination algorithm in accordance with the invention and performing the multilevel successive elimination algorithm for candidate blocks in the center of the predicted initial SAD.

FIG. 4 shows a view for explaining operations of the step 301 of FIG. 3 in detail. Referring to FIG. 4, the initial block P is selected based on the motion vector prediction and the SAD of the initial block P is computed as the initial SAD. At the step of 302. based on the initial image block, four vertex image blocks are selected for predicting elimination levels of neighbor blocks. Four image blocks are blocks located upper right, upper left, lower right and lower left based on the initial block 31. Those blocks are vertexes of a perfect square in the center of the initial image block 31. In other word, an imaginary perfect square is formed based on the initial candidate block as a center of the perfect square. The imaginary perfect square is formed by using neighbor blocks adjacent from the initial candidate block. Referring to FIG. 5, those vertex blocks are an upper right vertex block 41, an upper left vertex block 44, a lower left vertex block 43 and a lower right vertex block 42. After selecting the four image blocks including the upper right vertex block 41, the upper left vertex block 44, the lower right vertex block 47 and the lower vertex left block 43, elimination levels of the four vertex image blocks are computed at step 303. Based on the computed eliminating levels of four vertex blocks, elimination levels of blocks located in each side of the perfect square in the center of the initial image block can be predicted at the step 304. The elimination levels of side blocks are intermediate values between the elimination levels of vertex blocks. That is, referring to FIG. 5, the elimination level of the side block 45 is intermediate value between the upper left vertex block 44 and the upper right vertex block 41. Therefore, if the elimination level of the block 44 is 2 and the elimination level of the block 41 is 4, an elimination level of block 45 must be equal or larger than 2 and equal or smaller than 4. For computing the elimination level of block 45, the elimination levels of 0,1 are not considered and it is computed to start to compute the elimination level from level 2. Therefore, computing amount of elimination levels 0 and 1 could be reduced.

As mentioned above steps, elimination levels of the remaining blocks 45–48 are computed from the predicted elimination levels at step 304.

Figure 6:
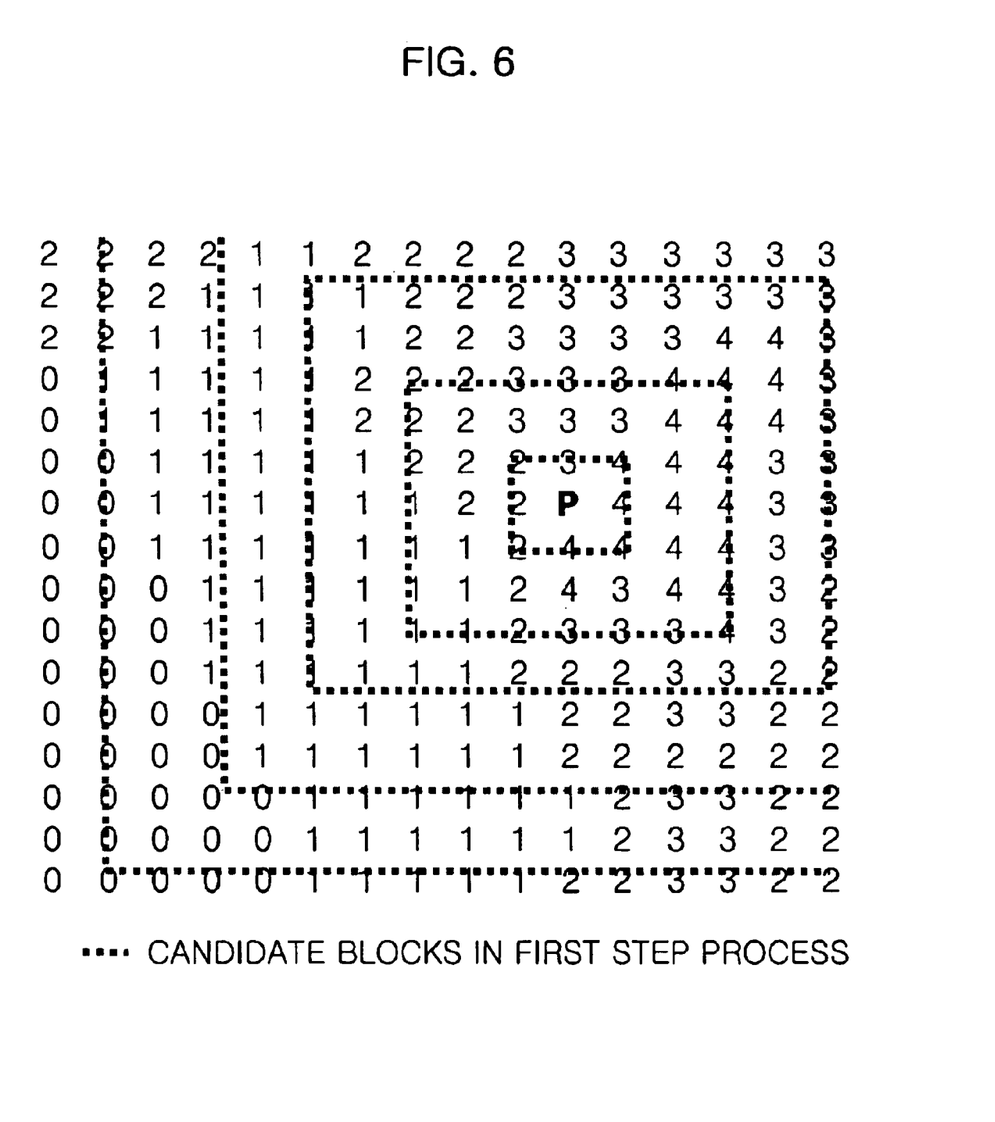
FIG. 6 offers an illustrative diagram for explaining a process of performing the multilevel successive elimination algorithm for a next candidate block that is skipped by one block in the moving image motion estimation method using the multilevel successive elimination algorithm in accordance with the invention.

After that, as shown in FIG. 6, at step 305, it is determined whether any neighbor blocks adjacent from the vertex candidate blocks and side candidate block of steps 303 and 304. If there is not any block that is boundary blocks of the image frame, an imaginary expended square is formed by using next candidate blocks which are one block away from the vertex candidate block and side candidate block in the helical fashion at the step 306. The steps 303 and 304 are performed for extracting elimination levels of four vertex candidate blocks of the imaginary expended square, predicting elimination levels of side candidate blocks of the imaginary expended square based on the elimination levels of the four vertex candidate blocks and extracting elimination levels of the side candidate blocks. The steps 303 and 304 are repeatedly performed until arriving at a boundary block of image frame.

Figure 7:
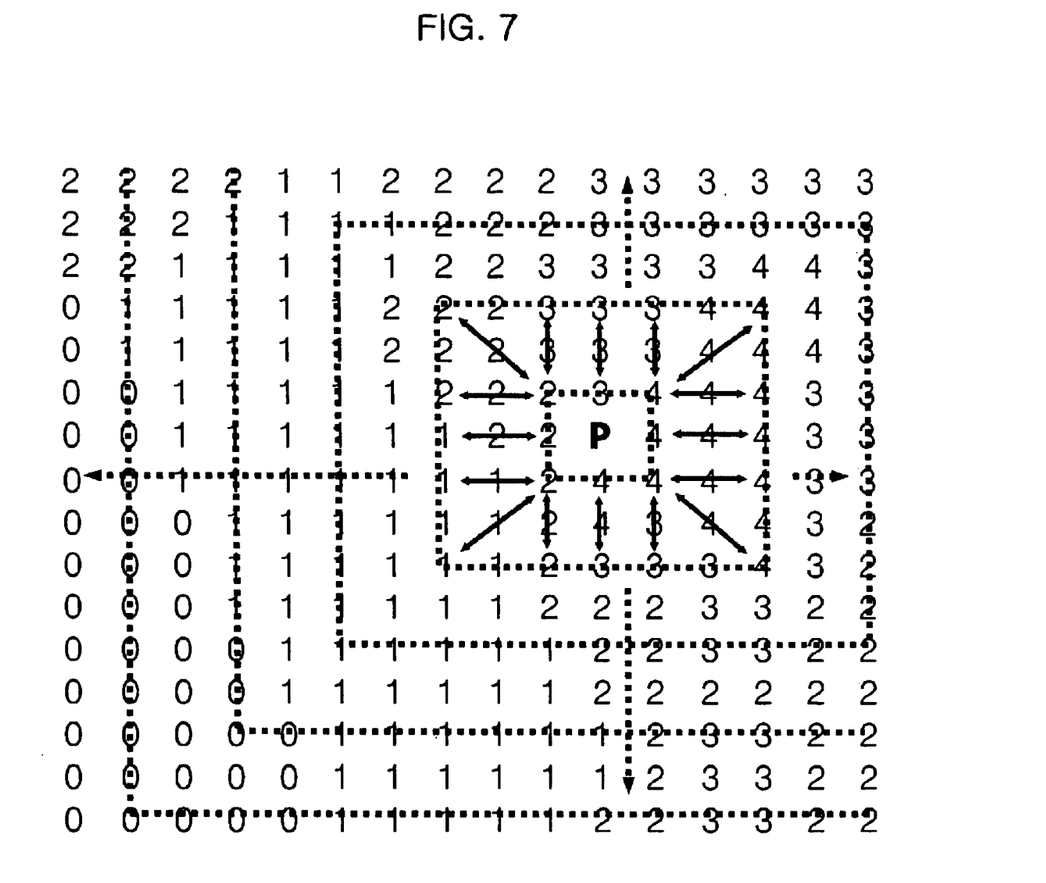
FIG. 7 provides an illustrative diagram for explaining a process performing the multilevel successive elimination algorithm for ½ of candidate blocks that the multilevel successive elimination algorithm is not performed in the moving image motion estimation method employing the multilevel successive elimination algorithm in accordance with the present invention.

Further, as shown in FIG. 7, elimination levels for remaining candidate blocks, i.e., ½ of the candidate blocks, that are not extracted are predicted by the elimination levels of the blocks of both directions that are already obtained by performing the MSEA; and then they are extracted by performing the MSEA for the predicted elimination levels at step 307. At that time, the step 307 is carried out for all candidate blocks for which the MSEA is not performed within the search region; and, in the process of predicting the elimination level of the candidate block using the already extracted elimination levels, the lowest elimination level is selected by comparing elimination levels which the candidate blocks overlap with their both ends of diagonal and straight lines.

In accordance with the motion estimation method of the present invention as mentioned above, rapid calculation is made while obtaining optimized solution, thereby decreasing time taken for compression process and also decreasing power consumption; and calculation gain of about 8.5–15.39% for SIF formation and 4.4–11.7% for QCIF formation can be obtained compared to the prior art MSEA.

Further, in case the motion estimation method of the invention employs the ESEA, calculation gain of about 10.1–18.8% for SIF formation and 5.3–17.2% for QCIF formation can be obtained compared to the prior art MSEA.

The present invention as described above can be implemented as a software program stored in a computer readable recording medium such as CD-ROM, RAM, ROM, floppy disk, hard disk and optical magnetic disk. Since this process can be easily implemented by those skilled in the art, details thereof are omitted herein for the purpose of simplicity.

As a result, the present invention has advantages in that unnecessary loads can be removed and the overall calculation amount can be decreased by searching candidate blocks that are in the center of predicted initial location in the helical fashion, predicting elimination levels of candidate blocks depending on the spatial correlation, and performing the MSEA for the predicted elimination levels, without progressing the MSEA in sequence when performing the MSEA for the candidate blocks within the search region.

Moreover, the present invention is capable of improving the compression process speed as the rapid calculation is made while obtaining the optimized solution.

While the present invention has been described with respect to the particular embodiments, it will be apparent to those skilled in the art that various changes and modifications may be made without departing from the spirit and scope of the invention as defined in the following claims.

What is claimed is:

1. A method for performing motion estimation of moving image by using a multilevel successive elimination algorithm (MSEA), comprising:

a) selecting an initial candidate block among a plurality of candidate blocks in an image frame for computing an initial SAD;

b) selecting four vertex candidate blocks placed at vertexes of a imaginary perfect square based on the initial candidate block as the center of the imaginary perfect square, wherein the imaginary perfect square is formed by using neighbor blocks adjacent from the initial candidate block;

c) extracting elimination levels of the four vertex candidate blocks by performing the MSEA;

d) predicting elimination levels for side candidate blocks which are located at sides of the perfect square based on a spatial correlation between elimination levels of candidate blocks and the extracted elimination levels of the four vertex candidate blocks; and e) extracting elimination levels of the side candidate blocks by performing the MSEA based on the predicted elimination level.

2. The method as recited in claim 1, further comprising:

f) determining whether all blocks adjacent from the four vertex candidate blocks and the side candidate blocks are a boundary block of the image frame or not;

g) selecting four vertex candidate blocks of imaginary expended square based on the initial candidate block as the center of the imaginary expended square, wherein the imaginary expended square is formed by blocks located one blocks away from the four vertex candidate blocks and side candidate blocks in the step a), if there is any adjacent blocks existed as a result of step f); and h) performing steps c) to e) for extracting elimination levels of four vertex candidate blocks of the imaginary expended square, predicting elimination levels of side candidate blocks of the imaginary expended square based on the elimination levels of the four vertex candidate blocks and extracting elimination levels of the side candidate blocks.

3. The method as recited in claim 1, wherein the elimination level of side candidate blocks in the step d) are predicted by selecting the lowest elimination level between the elimination levels of two corresponding vertex candidate block as the predicted elimination level of the side candidate blocks, wherein the two corresponding vertex candidate blocks are two end points of the side including the side candidate blocks, and computing elimination level of the side candidate blocks based on the predicted elimination level.

4. The method as recited in claim 2, wherein the step f) includes a step of extracting and predicting elimination levels of remained candidate blocks in the image frame which do not have extracted elimination level based on the extracted elimination levels of neighbor candidate blocks.

5. The method as recited in claim 4, wherein the elimination level of remained candidate blocks in the step f) are predicted by selecting the lowest elimination level by comparing elimination levels of the neighbor candidate blocks overlap with their both ends of diagonal and straight lines.

6. A computer readable recording medium storing instructions for executing a moving image motion estimation method of moving image using a multilevel successive elimination algorithm (MSEA), the moving image motion estimation method comprising:

a) selecting an initial candidate block among a plurality of candidate blocks in an image frame for computing an initial SAD;

b) selecting four vertex candidate blocks placed at vertexes of a imaginary perfect square based on the initial candidate block as the center of the imaginary perfect square, wherein the imaginary perfect square is formed by using neighbor blocks adjacent from the initial candidate block;

c) extracting elimination levels of the four vertex candidate blocks by performing the MSEA;

d) predicting elimination levels for side candidate blocks which are located at sides of the perfect square by using the extracted elimination levels of the four vertex candidate blocks; and e) extracting elimination levels of the side candidate blocks by performing the MSEA based on the predicted elimination level.

7. The computer readable recording medium as recited in claim 6, the method further comprising:

f) determining whether all blocks adjacent from the four vertex candidate blocks and the side candidate blocks are a boundary block of the image frame or not;

g) selecting four vertex candidate blocks of imaginary expended square based on the initial candidate block as the center of the imaginary expended square, wherein the imaginary expended square is formed by blocks located one blocks away from the four vertex candidate blocks and side candidate blocks in the step a), if there is any adjacent blocks existed as a result of step f); and h) performing steps c) to e) for extracting elimination levels of four vertex candidate blocks of the imaginary expended square, predicting elimination levels of side candidate blocks of the imaginary expended square based on the elimination levels of the four vertex candidate blocks and extracting elimination levels of the side candidate blocks.

* * * * *